(12) United States Patent
West

(10) Patent No.: US 6,532,434 B1
(45) Date of Patent: Mar. 11, 2003

(54) MODULAR DATA SENSING AND LOGGING SYSTEM

(76) Inventor: David A. West, 283 Whitewood Dr., Streamwood, IL (US) 60107

( * ) Notice: Subject to any disclaimer, the term of this patent is extended or adjusted under 35 U.S.C. 154(b) by 179 days.

(21) Appl. No.: 09/585,863

(22) Filed: Jun. 1, 2000

Related U.S. Application Data
(60) Provisional application No. 60/137,247, filed on Jun. 2, 1999.

(51) Int. Cl.$^7$ .............................................. G06F 15/00
(52) U.S. Cl. ......................................... 702/187; 706/47
(58) Field of Search ................................ 702/187, 188, 702/178; 250/571, 573, 574; 706/47, 50; 347/191, 194; 374/119

(56) References Cited

U.S. PATENT DOCUMENTS

| | | | |
|---|---|---|---|
| 4,027,289 A | | 5/1977 | Toman |
| 4,470,116 A | | 9/1984 | Ratchford |
| 4,970,648 A | | 11/1990 | Capots |
| 5,289,377 A | | 2/1994 | Yokote et al. |
| 5,412,221 A | * | 5/1995 | Curtis et al. ................. 250/573 |
| 6,088,514 A | * | 7/2000 | Foreman et al. ............... 700/5 |
| 6,243,662 B1 | * | 6/2001 | Hashimoto ................... 345/723 |
| 6,285,955 B1 | * | 9/2001 | Goldwasser .................... 702/6 |

OTHER PUBLICATIONS

Dallas Semiconductor, Data Sheet: DS1820 1–Wire Digital Thermometer, Mar. 5, 1998, pp. 9–19, Dallas Semiconductor Corp. . Dallas, TX.

* cited by examiner

*Primary Examiner*—Kamini Shah

(57) ABSTRACT

An apparatus and method for the periodic acquisition of data through the use of sensors and/or electronic interfaces. The apparatus is modular, having a control module and one or more A acquisition modules interconnected with a module bus. The control module provides timing and control information to the acquisition modules, as well as an interface for communication to a host computer. Each acquisition module contains circuitry to make measurements of one or more physical property and convert the measurements into digital values. Temperature, altitude, airspeed, engine speed, gravitational force, pulse width, and voltage are examples of physical values that may be measured. Each acquisition module also contains electronic memory in which the digital values are stored. In operation the control module keeps track of elapsed time and periodically signals the acquisition modules to make readings and store values. When data logging is complete, the system is attached to the host computer and the data stored in each acquisition module is transferred for analysis. Calibration values for correction of sensor gain, offset, linearity, or other factors may be stored in a separate parameter area within each acquisition module's memory. These values can then be used by the host computer to adjust and

20 Claims, 9 Drawing Sheets

MODULAR DATA SENSING AND LOGGING SYSTEM

CROSS-REFERENCE TO RELATED APPLICATIONS

This application claims the benefit of U.S. Provisional Application No. 60/137,247, filed Jun. 02, 1999.

BACKGROUND OF THE INVENTION

This invention relates to the field of data acquisition and recording, specifically to data logging equipment that take readings of physical properties at predetermined intervals and store the readings in memory for later analysis.

Data logging equipment has undergone considerable improvement owing to advances in electronics. Where early units stored data in the form of a pen drawing on a paper chart or as analog signals on magnetic tape, units can now convert and store data in semiconductor memory in digital form. This form of storage allows easy input into computer systems for data analysis.

Many data logging systems are designed for a single specific task (such as aircraft flight data recorders) having only the interfaces, sensors, and memory required for that specific task. Other logging systems (such as those designed for general laboratory use) offer a greater number of configurations. Unfortunately, the flexibility of even the most general designs is limited by the number of available, input channels and by memory size constraints.

The typical data logging system consists of a central controller with memory, and a number of sensor interface channels. Even when these channels are configurable for different sensors the number of channels is limited. Should a user need just one additional channel a larger system with an upgraded central controller, more memory, and many more channels is required. This can often lead the user to purchase a larger system than needed to insure that it will be adequate for possible future requirements. In addition to the higher cost of more capable systems, their physical size limits their usefulness in many portable applications.

Some systems include a great deal of computational analysis power—adding cost and complexity. Since general purpose computers are widely available, the need for such power within the logging system is questionable.

Clearly, there is a need for a data sensing and logging system with the flexibility to address a range of tasks, that can be adequately expanded, where only the features required for a particular application need be included, and where minimal size and complexity insure portability. The present invention fulfills all these needs.

SUMMARY OF THE INVENTION

The present invention is an apparatus and method for periodic acquisition of data through the use of sensors and/or electronic interfaces. This data is stored in electronic memory for future computer analysis. The apparatus is modular, having a control module and zero or more acquisition modules. The control module provides timing and control information to the acquisition modules. It also provides the interface functionality for communication to a host computer. Each acquisition module contains circuitry to make measurements of one or more physical property and convert the measurement into a digital value. Temperature, altitude, airspeed, engine speed, gravitational force, magnetic force, pulse width, voltage, and current are but a few examples of physical values that may be measured. Each acquisition module also contains electronic memory in which to store the digital value. Additionally, each acquisition module has an interface link to the control module.

Having each acquisition module measure and store a single physical property gives the greatest flexibility in choosing modules for a specific application. However, it may be economical and useful to combine more than one acquisition function into a single module, or even add acquisition module functionality to the control module.

A typical system would consist of a control module and several acquisition modules. The acquisition modules would be selected to measure those physical values of interest for a specific application. In operation the control module would keep track of elapsed time and periodically signal the acquisition modules to make readings and store values. The amount of time between readings would be previously programmed into the control module and would be application dependent. This mode of operation of making periodic measurements and storing values is the data logging mode. In the data logging mode the system need not be attached to a host computer. Often the system would be in a remote location while in the data loging mode.

When data logging is complete, the system is attached to a host computer through an interface on the control module. The data stored in each acquisition module is then transferred, via the control module, to the host computer. Software within the host computer can then store, analyze, chart, or otherwise process the data. Calibration values for correction of acquisition sensor gain, offset, linearity, or other factors may be stored in a separate parameter area within each acquisition module's memory. These values can then be used by the host computer to adjust and correct the acquired data.

The host computer can also send commands to the modules to perform functions such as clearing the module memory and setting the period between data readings.

DESCRIPTION OF THE PREFERRED EMBODIMENT

The following description is of an embodiment of a data sensing and logging system to be used in a remotely piloted aircraft. The control system commonly used in remotely piloted aircraft typically comprises a radio receiver with digital decoding functions providing several channels of pulse width modulated control signals which are output to electromechanical servos for actuating flight control surfaces. The present invention embodiment does not replace or change the operation of the control system, but does draw power from the system and monitors the pulse outputs of the receiver/decoder.

For this application the following physical properties are to be measured: altitude (via barometric pressure sensing), engine speed, G-force, airspeed (via differential pressure sensing), and control surface position (via pulse width measurement). Through this description the construction and operation of the invention will be detailed. However, the scope of the invention extends beyond this specific application and this embodiment.

Figure 1:
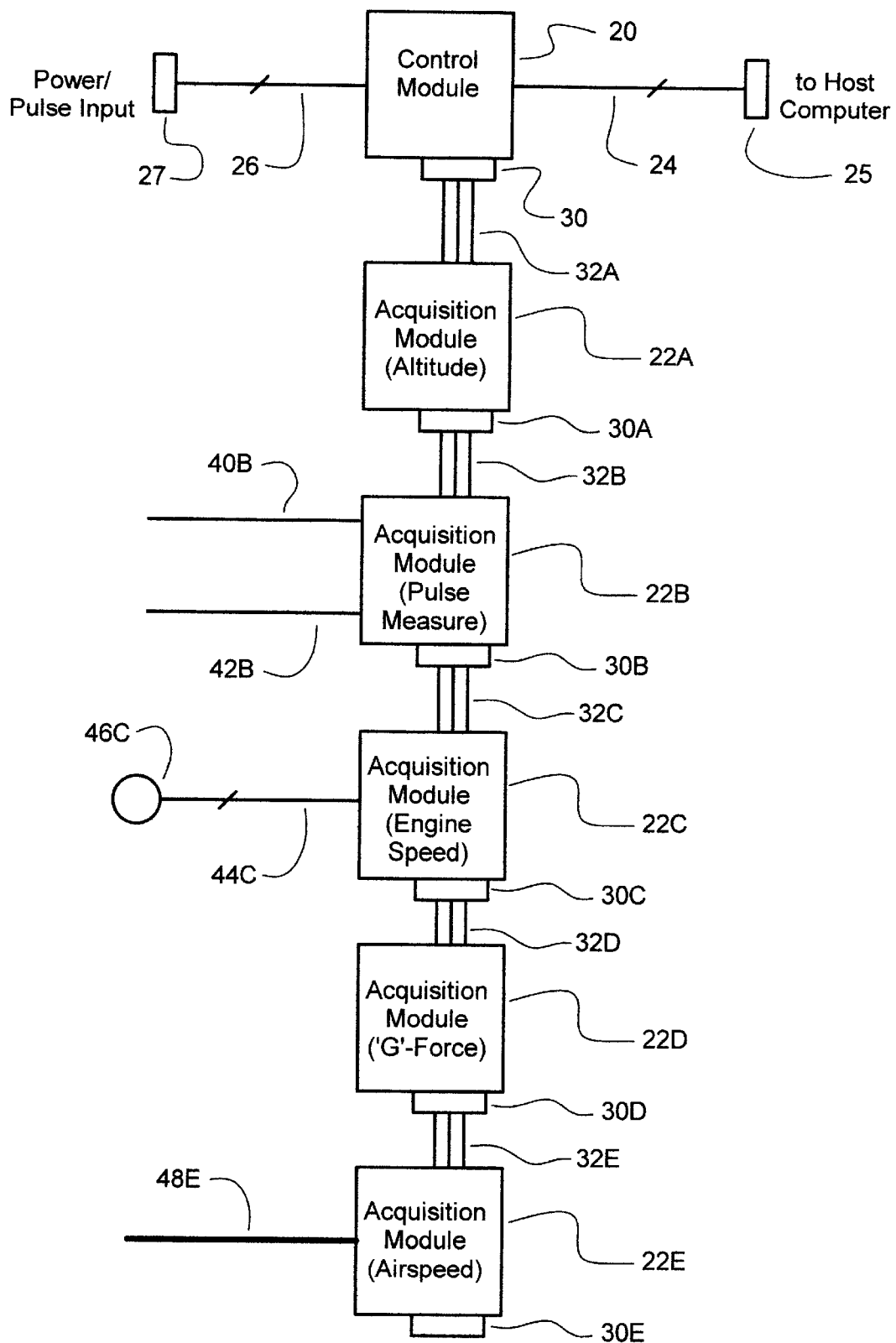
FIG. 1 is a partially block diagram, partially schematic diagram of an example embodiment displaying one control module and five acquisition modules.

FIG. 1 shows an example embodiment of the modular data sensing and logging system. A control module 20 is shown with a module bus connector 30. Connector 30 has three conductors and provides for communication with the acquisition modules. A host computer interface connector 25 is attached to control module 20 via host computer interface wiring 24. Host connector 25 is used when data is exchanged between the system and a host computer. During data logging mode host connector 25 is not used.

In this application, control module 20 performs an acquisition function as well as its timing and interface functions. It measures the pulse width of one channel of the remotely piloted aircraft's airborne control system. A power/airborne system connector 27 provides this signal to control module 20 via power/airborne system wiring 26. This connection also provides power from the airborne system to control module 20.

FIG. 1 also shows an altitude acquisition module 22A with a module bus connector 30A. Altitude module 22A is connected to control module 20 via module bus wiring 32A and module bus connector 30.

Figure 5:
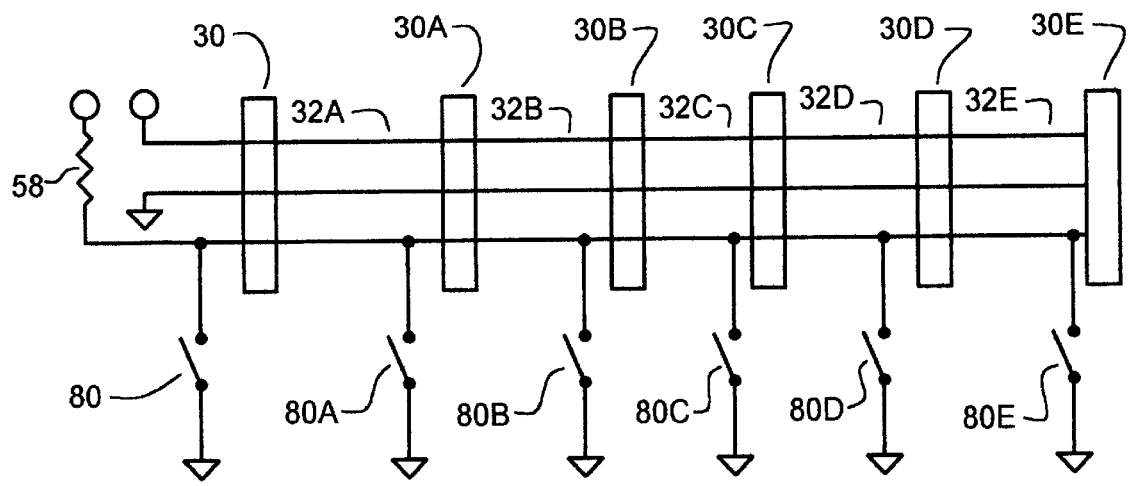
FIG. 5 is a partially block diagram, partially schematic diagram of a module data bus.

Similarly, a pulse acquisition module 22B, an engine speed acquisition module 22C, a G-force acquisition module 22D, and an airspeed acquisition module 22E, each have a module bus connector (30B, 30C, 30D, and 30E respectively). Additionally, each acquisition module (22B, 22C, 22D, and 22E) has module bus wiring (32B, 32C, 32D, and 32E) which connects to the module bus connector of another module (30A, 30B, 30C, and 30D respectively). These connections form a three-wire bus conveying power, ground, and signals between each acquisition module and control module 20. FIG. 5 also shows this connection.

Referring again to FIG. 1, note that pulse module 22B has two additional connections—an airborne system pulse channel 1 connection 40B, and an airborne system pulse channel 2 connection 42B. These are connections to the remotely piloted aircraft's airborne control system. In the aircraft these control pulse signals run from a radio receiver to servo systems that actuate flight control surfaces. In widely used digital proportional control systems these pulses typically range in width from 1.0 mS to 2.0 mS. The two channels of pulse module 22B combined with the channel of control module 20 give this example embodiment the capability of monitoring three of the aircraft control functions, such as: aileron, elevator, and throttle position. One can see that if additional functions are to be monitored (such as rudder and flap position) one need only add an additional pulse acquisition module to the system. This flexibility is one of the advantages of the present invention.

FIG. 1 also shows engine speed module 22C having an engine rotation sensor 46C and sensor/module interconnection wires 44C. This is an example of the case where a sensor needs to be located some distance from its associated module. Airspeed module 22E, has a ram air tube 48E. A differential pressure sensor is mounted within airspeed module 22E but a remote source of ram air is required. In this case the connection is made using an air tube as opposed to an electrical wire.

Figure 2:
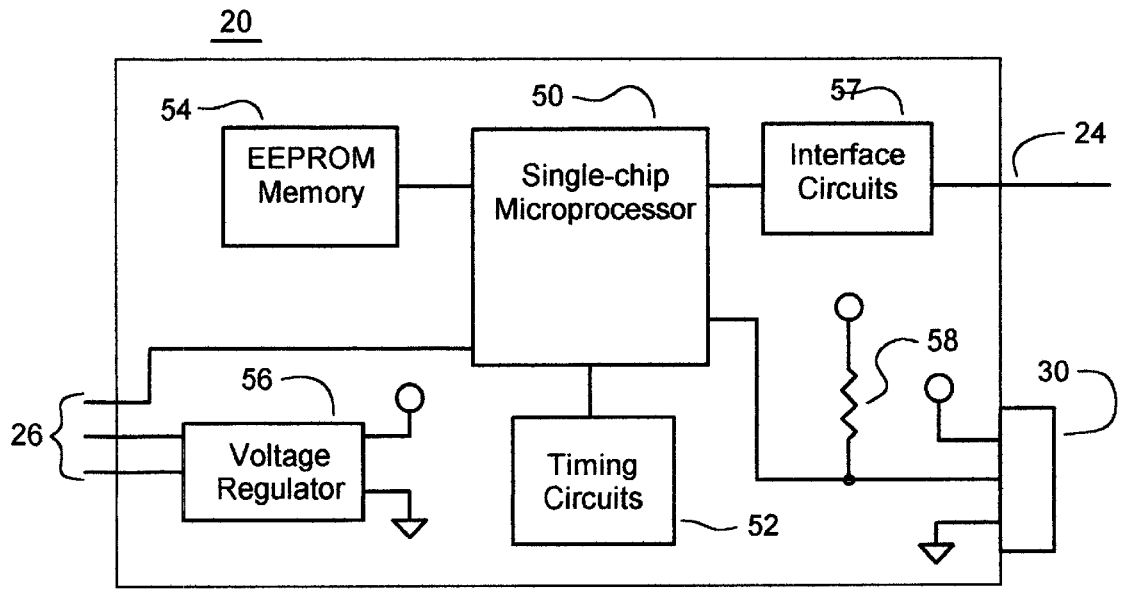
FIG. 2 is a partially block diagram, partially schematic diagram of a control module.

FIG. 2 details the make up of control module 20. A single-chip microcontroller 50 with internal program memory and I/O pin control is at the heart of the module. Timing circuits 52 provide a timing reference for microcontroller 50. Depending on the specific microcontroller used, much or all of the timing circuitry may be internal to the microcontroller. Typically, only a reference crystal or resonator is required.

A serial Electrically Erasable Programmable Read Only Memory(EEPROM) 54 is connected directly to microcontroller 50. The memory capacity of EEPROM 54 is application dependent. A 64K bit (8K Byte) device provides one byte of data storage each second for well over two hours. The EEPROM in this and other modules is used to store both the acquired data and parameter data. The parameter data is stored in a small (typically 32 byte) section of the memory and can hold calibration, compensation, and control values that are not changed during data logging. The balance of the EEPROM stores the acquired data, with a new value stored for each logging period.

Control module 20 also contains voltage regulation circuitry 56. This regulates the supply voltage from power/airborne system wiring 26 and provides a stable voltage supply for control module 20 as well as the other modules through module bus connector 30. A resistor 58 provides the passive pull-up required for the signal line of the module bus. Host computer interface wiring 24 connects to host interface circuitry 57 which in turn connect to microcontroller 50. For a simple logic-level serial interface to the host computer, interface circuitry 57 may be as simple as series current limiting resistors.

Figure 3:
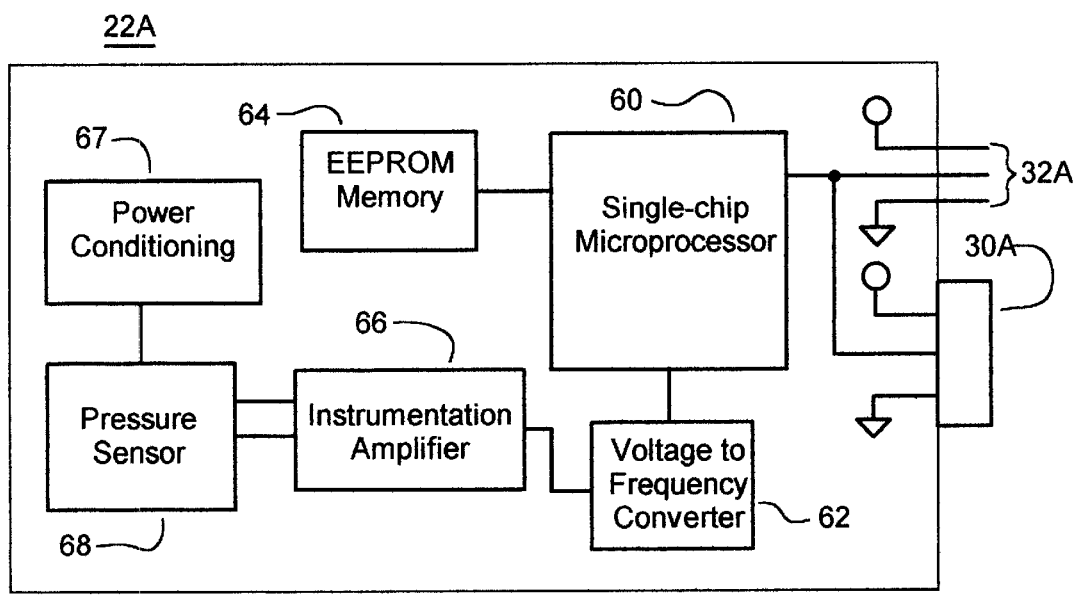
FIG. 3 is a partially block diagram, partially schematic diagram of an altitude acquisition module.

Referring to FIG. 3, a diagram of altitude acquisition module 22A is provided. It also has a single-chip microcontroller 60 connected to an EEPROM 64. In this case all timing circuitry required by the microcontroller is contained within the microcontroller. An atmospheric pressure sensor 68 produces a signal that changes proportionally with changes in air pressure. The correlation between atmospheric air pressure and altitude is well known in the art. Sensors like pressure sensor 68 often require special power conditioning circuitry to compensate for voltage and temperature variations. In FIG. 3 this is represented by power conditioning circuitry 67. The output of pressure sensor 68 is connected to an instrumentation amplifier 66. In addition to amplification, amplifier 66 converts a differential signal from pressure sensor 68 into a ground referenced signal. This in turn is sent into a voltage-to-frequency converter 62. The output of converter 62 is connected to microcontroller 60. An analog-to-digital converter could be used instead of voltage-to-frequency converter 62. Cost and performance issues make the voltage-to-frequency approach attractive in this application. The figure also shows connections to the module bus: module bus wiring 32A and module bus connector 30A.

Figure 4:
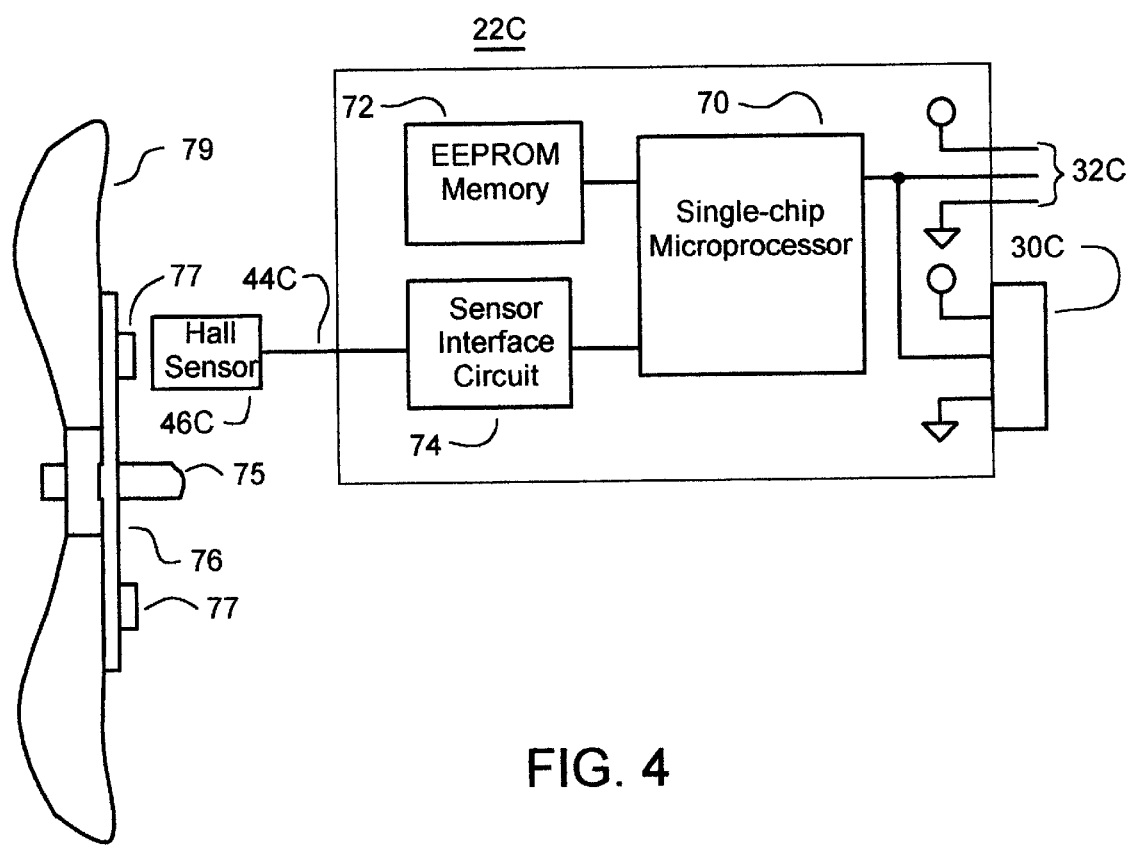
FIG. 4 is a partially block diagram, partially schematic diagram of an engine speed acquisition module.

FIG. 4 details engine speed acquisition module 22C. Again the module has a single chip microcontroller 70 connected to an EEPROM 72, module bus wiring 32C, and module bus connector 30C. Engine rotation sensor 46C attaches to the module via sensor/module interconnection wires 44C. Sensor 46C is a hall effect switch device that switches between a high and low state in the presence of the north and south magnetic poles. The figure shows two small magnets 77 mounted on a propeller back plate 76 attached to rotating engine shaft 75. One magnet has its north pole toward the plate the other has its south pole toward the plate. Mounting sensor 46C in close proximity to plate 76 results in one high-to-low switch for each rotation of motor shaft 75. Interconnection wires 44C bring the switch signal to a sensor interface circuit 74, and from there to microcontroller 70. Depending on the specific hall effect sensor used, interface circuit 74 may be a simple noise suppression circuit, or may include amplification and filtering.

Other acquisition modules have a similar structure to those shown in FIG. 3 and FIG. 4. The specific sensors used will vary, as will the sensor interface circuits, but the microcontroller, EEPROM, and interface circuits remain the same.

OPERATION OF THE PREFERRED EMBODIMENT

The Modular Data Sensing and Logging System has two primary modes of operation: data logging mode (during which each acquisition module acquires and stores sensed data as periodically commanded by the control module); and communication mode (during which data is transferred between the host computer and the modules). Each mode is described in detail in the following sections. Additionally, the operation of the three wire inter-module bus, module identification process, and parameter memory usage are described.

Data Logging Mode—Control Module

Figure 7:
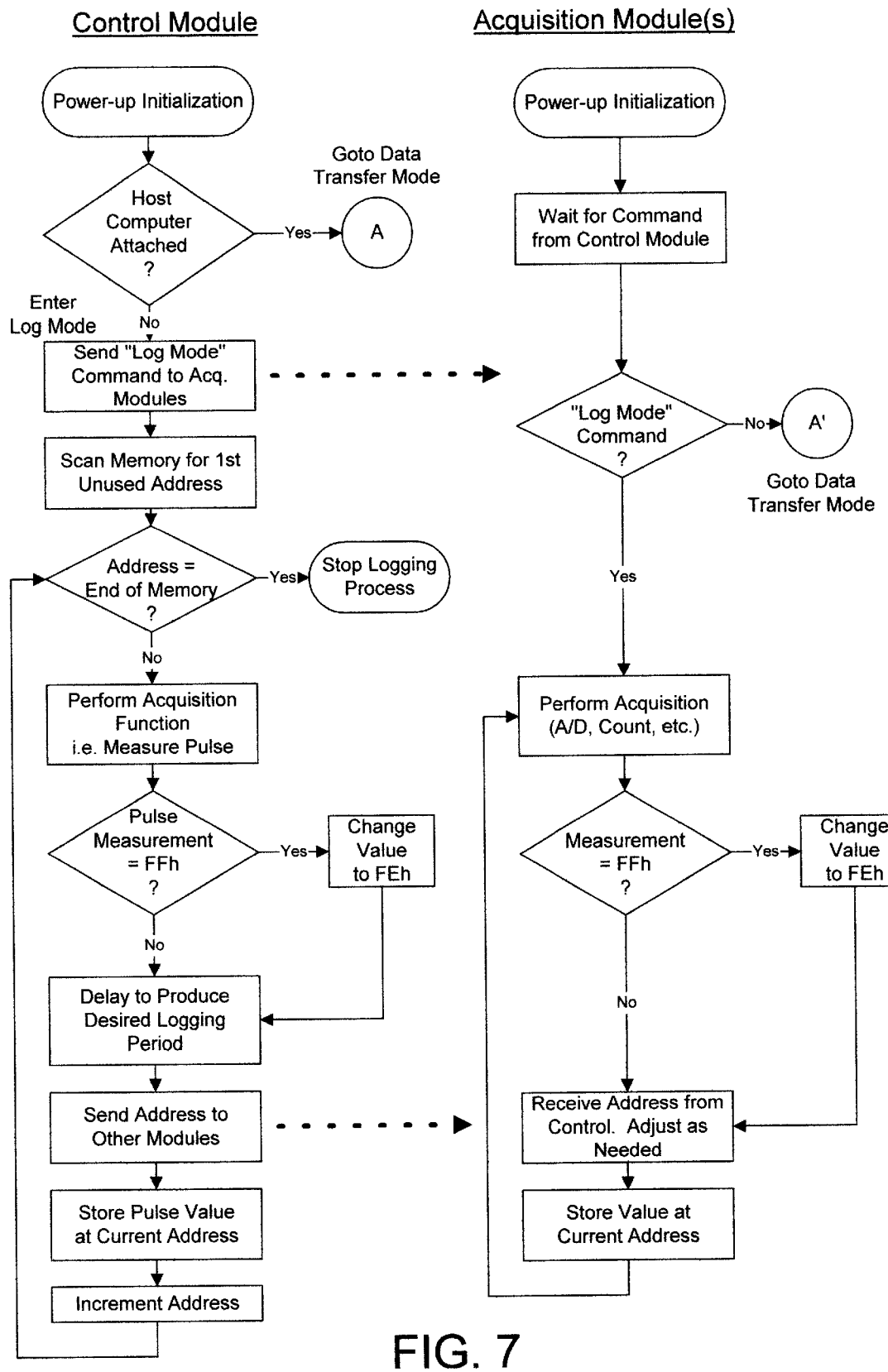
FIG. 7 is a flow chart of the data logging mode.

FIG. 7 is a flow chart which gives an overview of the data logging mode of operation. The left side of the chart covers operation of the control module functions, while the right side of the chart covers operation of each of the acquisition module. The dashed arrows between the two sides of the chart indicate communication that synchronizes the modules. As described in the previous section, this embodiment has five acquisition modules. Each of these simultaneously performs the functions shown on the right side of the flow chart. In this embodiment the control module performs a pulse acquisition function in addition to its control function. This pulse acquisition step is also shown in the flow chart.

Refer to the left side of FIG. 7 for the control module functions and FIG. 1 and FIG. 2 for reference numbers. After power is supplied to control module 20 via power/airborne system wiring 26, normal initialization functions of microprocessor 50 are performed, then host computer interface wiring 24 is sampled to determine if the host computer is attached. If it is attached the data transfer mode (described in the next section) is entered. If the host is not attached data logging mode (log mode) is entered.

A byte of data, representing a Log Mode Command is sent to all acquisition modules via connector 30 and the three-wire bus. Microprocessor 50 then scans the acquired data area of EEPROM 54 to find the first unused address.

An overview of the data structure is helpful in defining the term "unused address".Each byte location (or address) in the acquired data area of EEPROM 54 was initialized to a value of 'FF' hexadecimal. As data is stored each address is sequentially written with an acquisition data value. All values except 'FF' are valid for acquisition data. So, to find the address of the first unused memory location, the memory is sequentially read until the first occurrence of two 'FF' values in a row are found. The address of the second 'FF' is the desired location for the acquired data value, and is considered the first unused address. This leaves one 'FF' value as a marker of the start of the data collection.

Once this address is found it is checked to determine if it is at (or beyond) the last physical address of EEPROM 54. If this is the case, the logging process can not continue—the memory is full. Microprocessor 50 will perform an infinite loop until power is removed.

If this current address is not at the end of the memory, microprocessor 50 performs its acquisition function. Pulses from the remotely piloted aircraft's airborne control system are received via power/airborne system wiring 26. Methods to measure pulse width with a microprocessor are well known in the art. The measured pulse width data is scaled so as to fit in a single byte value range ('00' to 'FF' hexadecimal). If the value is 'FF' it is changed to 'FE' before storage—since 'FF' is reserved for use as a memory usage marker.

Microprocessor 50 will then use a timer function or a software delay loop to wait a sufficient amount of time to provide the desired period between log entries. The desired period is typically 0.5, 1, or 2 seconds for this application. The period is stored in the parameter area of EEPROM 54. This value can be set during data transfer mode. During log mode microprocessor 50 reads this value to determine the desired period and thereby the required delay.

The current address is sent to all acquisition modules via connector 30 and the three-wire bus. The measured pulse value is stored into EEPROM 54 at the current address. The current address is incremented, and the process (from the end of memory check) is repeated. This results in a pulse measurement being stored into each consecutive memory location, at each period. This continues until the end of memory is reached or until power is removed.

Data Logging Mode—Acquisition Modules

Refer to the right side of FIG. 7 for the flow chart followed by the acquisition modules during log mode, and to FIG. 1 for reference numbers. Acquisition modules 22A, 22B, 22C, 22D, and 22E are all connected in parallel to control module 20 by way of the three-wire bus. Each acquisition module follows the steps of the flow chart simultaneously. Throughout the data logging mode, they all receive input from the control module at the same time. Except where otherwise noted, the following description represents the operation of each and every acquisition module.

After power is applied (via the three-wire bus) the acquisition module's microprocessor performs any initialization process required by the specific circuitry. It then waits for a command byte from the control module. If the received command is not that indicating log mode the module enters data transfer mode. If the command is for logmode the flow continues as indicated in FIG. 7.

An acquisition is performed as appropriate to the specific module. Altitude acquisition module 22A (FIG. 3) uses voltage to frequency converter 62 to take a reading of the output of pressure sensor 68. Pulse acquisition module 22B (FIG. 1) measures pulse widths of two channels of the airborne system. Engine speed acquisition module 22C (FIG. 4) makes a reading of the timing of input from hall sensor 46C of the rotational speed of a propeller (79). 'G'-force acquisition module 22D (FIG. 1) reads its acceleration sensor. Airspeed acquisition module 22E takes a reading of its pressure sensor.

If the data byte resulting from the acquisition is equal to 'FF' it is changed to 'FE'. This allows the 'FF' value to be used as an indicator of unused memory, just as in the control module case.

Once acquisition is complete, the module waits to receive an address from the control module. Once the address is received, the module stores the acquired value at that address.

In some cases, to provide sufficient resolution or accuracy, the acquired value may be more than one byte in length. For example, since pulse acquisition module 22B measures two separate pulse inputs, two bytes are used for each acquisition period. In this case an EEPROM with twice the capacity of that of the control module is used. The received address is adjusted (doubled), giving a new address local to this module. The two data bytes are then stored in sequential locations. Note that other methods, such as having two EEPROMs, or a two byte wide memory could also be used. The number of bytes per reading can be stored in the parameter memory so that the host computer can do any necessary adjustments during data transfer mode.

In the case of altitude acquisition module 22A, resolution is increased by storing only the least significant byte of data and allowing the byte to "roll over".For example, if each count of the data byte represents five feet of altitude, a single byte can only represent (256 * 5) 1280 feet of altitude. However, if the host computer interprets a value of zero (or other low value) following a value of 256 (or other high value) as an addition to the 1280 feet, a greater altitude range can be covered without resorting to an additional byte of storage. This works well as long as the altitude can not change too greatly between acquisition periods. If the remotely piloted aircraft has a maximum vertical speed of a few hundred feet per second, and the acquisition period is one second, the host computer has no problem correctly processing the data.

Once the acquired value is stored, the acquisition module repeats the acquisition process, as shown in FIG. 7. The receipt of addresses from the control module paces the process, so that the acquisition modules do not need to keep track of the acquisition period or the storage addresses themselves. They need only complete the acquisition and storage process within the acquisition period. The process keeps repeating until power is removed or until no address information is received from the control module (as in the case of memory full).

Host Computer Communication Mode

The primary function of the communication mode is to transfer data, stored during the logging mode, into a host computer. Additionally, this mode allows the host computer to access and modify parameter memory, and perform acquire-on-command functions for test purposes. The host computer may be a Personal Computer or any other processing apparatus capable of storing and manipulating the logged data into a useful format.

Figure 8:
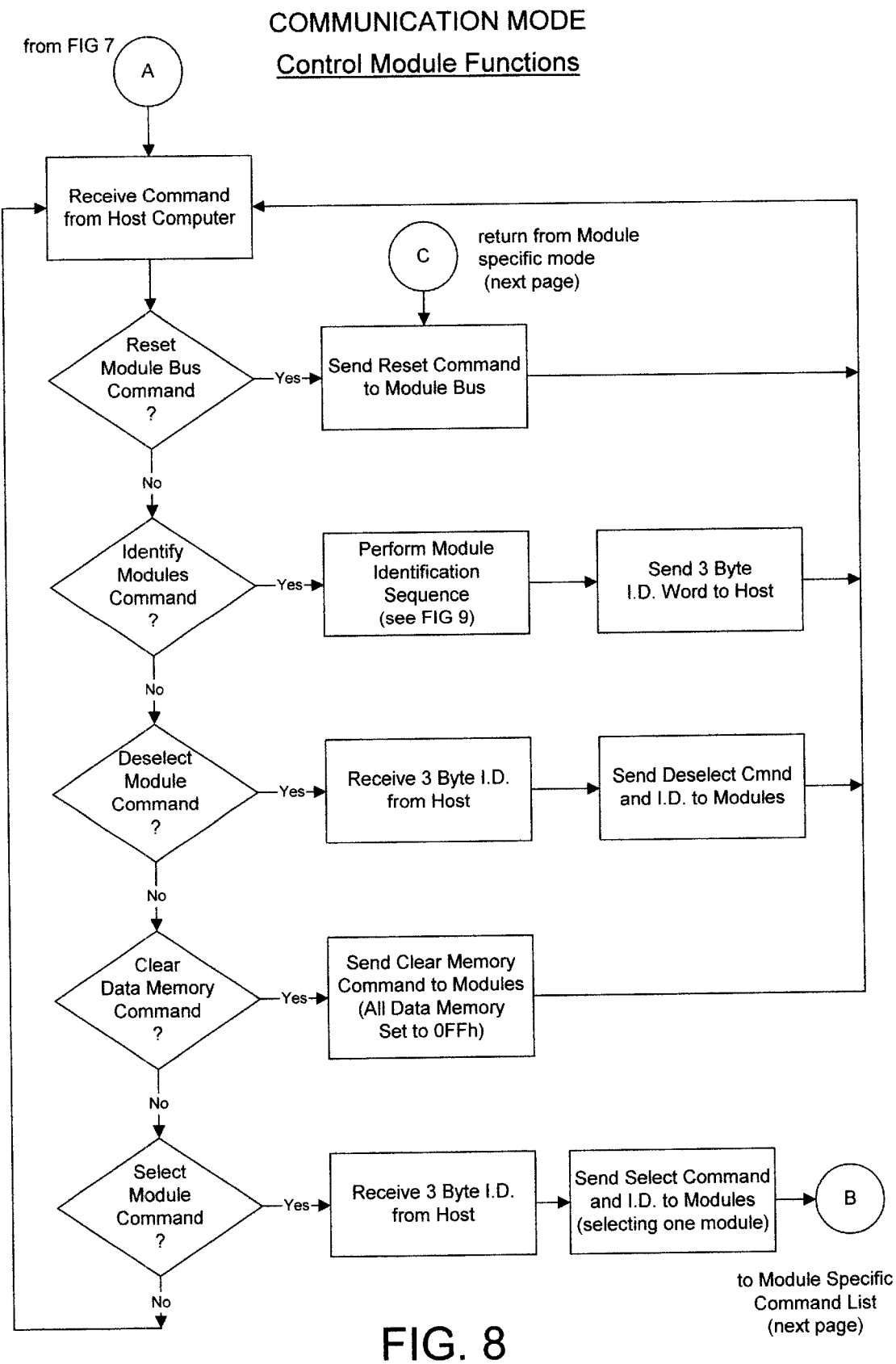
FIG. 8 is a flow chart of control module operation in the communication mode.
Figure 8:
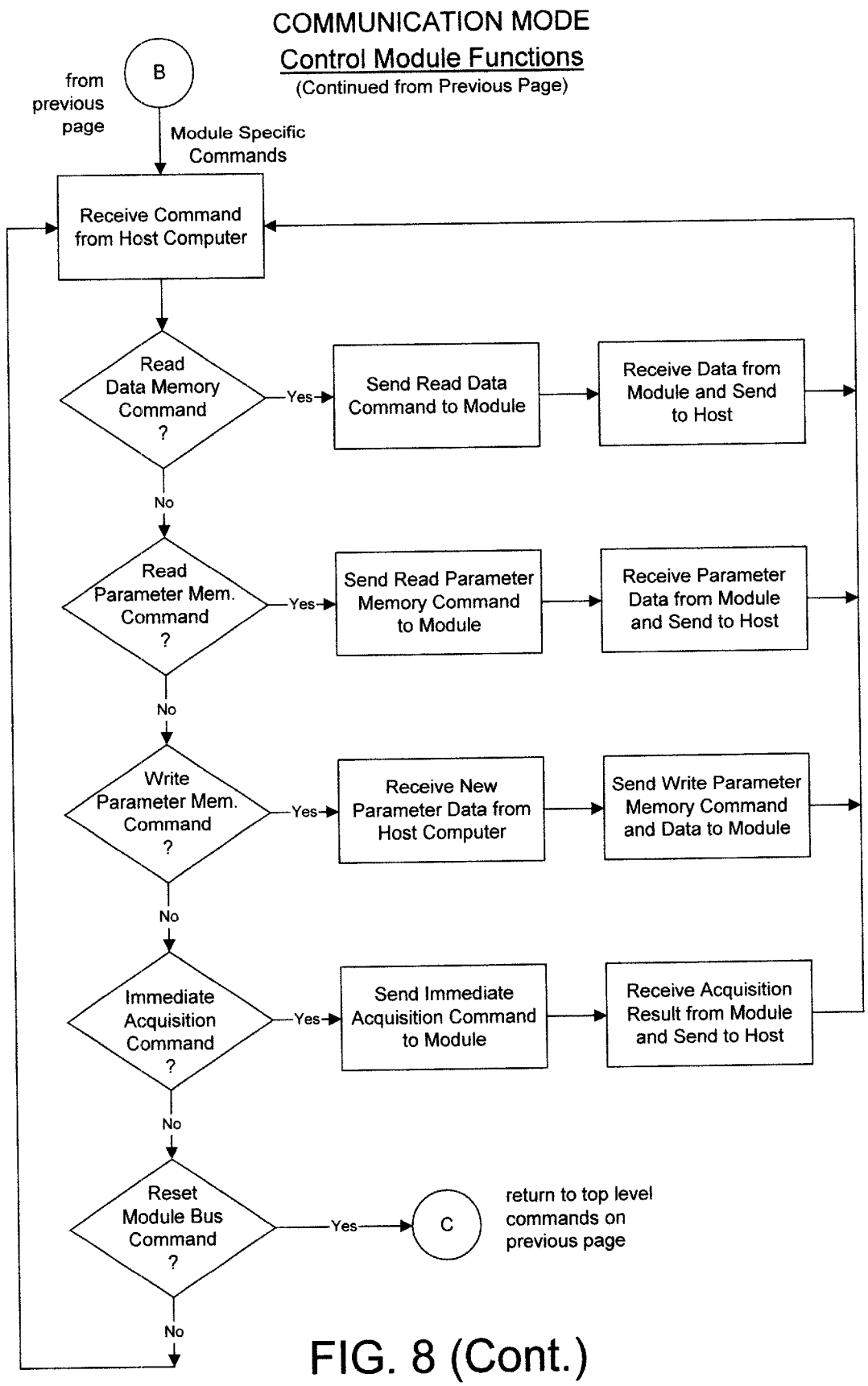

FIG. 8 is a two page flow chart that details the functions of control module 20 during communication mode. All data transferred from the acquisition modules passes through the control module.

As indicated in FIG. 7, after power-up initialization, control module 20 detects the connection of the host computer to initiate the communication mode. Referring again to FIG. 8, the control module awaits the receipt of a command from the host computer.

These single byte commands can be divided into two groups. The first are commands that are relayed to all of the acquisition modules by the control module. These include commands to: reset the modules, identify the modules, deselect a module, clear data memory, and select a module. The second group of commands is used after a specific module has been selected. These module specific commands include commands to: read the module's acquisition data memory, read the module's parameter memory, write the module's parameter memory, and have the module immediately perform an acquisition and report the result. After responding to each command, the, control module simply awaits the next command.

Starting with the first group; the "reset" command causes the control module to send a reset pulse to all the acquisition modules via the three-wire bus. This activates all modules to monitor the bus for further commands.

The "identify modules" command allows the host to determine the type and identifying serial number of each module currently in use. Each time this command is issued the control module responds with a three byte identification number of one module (one byte indicates the module type, while two bytes indicate the module serial number). Details of this identification process are covered in a following section.

The "deselect module" command is followed by the three byte identification (I.D.) word of the module to be deselected. The module with the corresponding I.D. will no longer respond to any command until the next bus reset is issued.

The "clear data memory" command results in the resetting of all acquisition memory in all modules to the hexadecimal value 'FF'. The parameter memory within each module is not affected. This command is used after all data has been transferred to the host, in preparation for operation of the logging mode.

The final general command is the "select module" command. It is followed by the three byte I.D. of the module to be selected. All modules that do not have a matching I.D. will no longer respond to any command until the next bus reset is issued. This effectively isolates a single module for communication with the host. This also enables the selected module to respond to the second group of commands—the module specific commands.

The "read data memory" command is relayed to the selected module by the control module. The selected module then sends, via the control module, the contents of its acquisition data memory to the host. The data sequence of 'FF FF', or the end of memory is used to indicate the end of acquired data.

The "read parameter memory" command has a similar result, except that the 32 byte contents of the parameter memory are sent to the host instead of the acquisition data memory.

The "write parameter memory" command is followed by 32 bytes of data that is stored in the module's parameter memory area. This data may consist of calibration factors or other information as described elsewhere in this disclosure. In this example embodiment, 32 bytes are used for the parameter memory size, however, this could be different for different applications.

The "immediate acquisition" command instructs the selected module to perform a single acquisition cycle and report the result to the host (via the control module). This is useful for module testing and calibration.

Issuing a "reset" command will cause the control module to issue a reset pulse over the three-wire bus. This causes all modules to again monitor the bus and re-enables the use of the first group of general commands.

Three-wire Bus Operation

Communication between the control module and acquisition modules is accomplished through the use of a three-wire bus. FIG. 5 illustrates the bus connections. Bus connectors 30, 30A, 30B, 30C, 30D, and 30E are associated with control module 20, altitude acquisition module 22A, pulse acquisition module 22B, engine speed acquisition module 22C, 'G'-force acquisition module 22D, and airspeed acquisition module 22E respectively. The modules' bus connectors are linked by module bus wiring 32A, 32B, 32C, 32D, and 32E as shown.

The three wires forming the bus consist of a power line, a ground line, and a signal line. Control module 20 serves as the power source in this embodiment. Resister 58 is located within control module 20 and acts a passive pull-up for the signal line. Each module contains a switch (80, 80A, 80B, 80C, 80D, and 80E) capable of pulling the signal line toward ground potential. Each switch is controlled by its respective module's microprocessor. Physically the switches consist of transistors located within the microprocessors in this embodiment. Note that if any switch is active (closed) the signal line across the entire bus is pulled toward ground potential (a LOW logic state). Only if all switches are open will resister 58 pull the signal line toward the power potential (a HIGH logic state).

Figure 6:
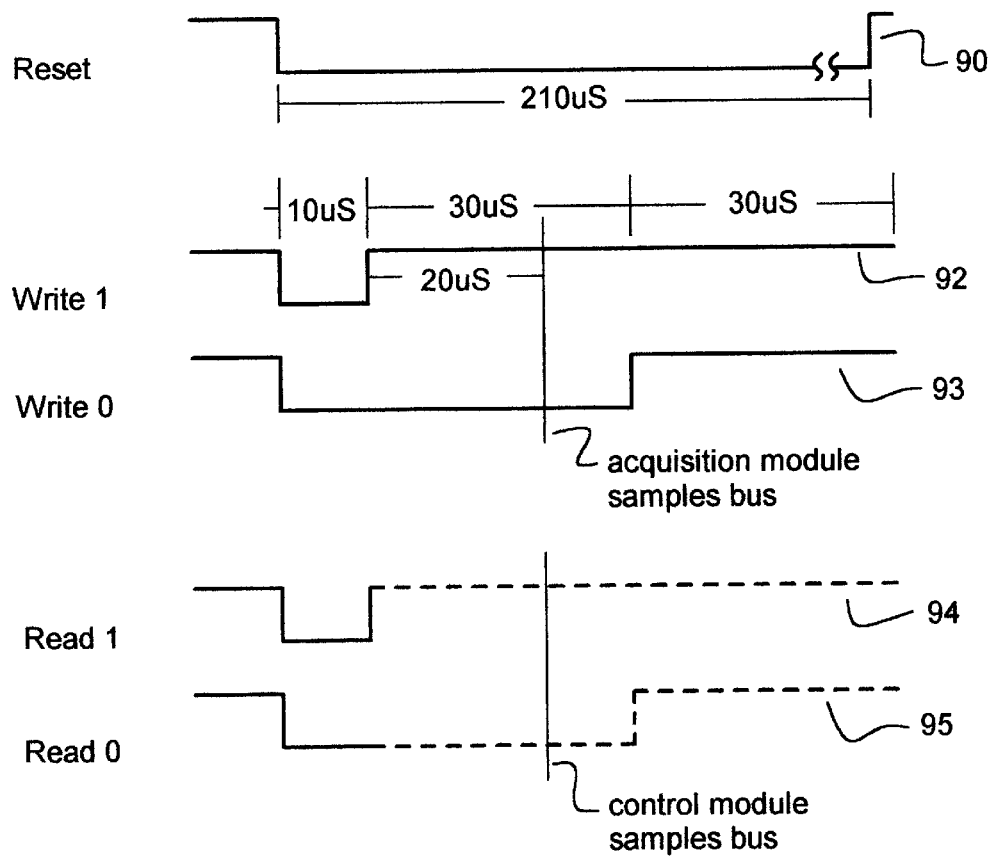
FIG. 6 is a timing diagram of module data bus signals.

In addition to controlling a switch, the microprocessor within each module has the ability to monitor the logic state of the signal line. This single signal line is used for transferring digital information from the control module to the acquisition modules as well as from the acquisition modules to the control module. FIG. 6 illustrates the timing of this inter-module communication.

In FIG. 6 solid lines in the waveforms indicate that control module 20 controls the bus. Dashed lines in the waveforms indicate one or more acquisition modules controls the bus. Waveform 90 depicts a bus reset condition in which control module 20 closes switch 80 for a long period (210 uS), then opens switch 80. Acquisition modules respond by entering a state ready to receive data. In this state all module switches are open and the bus is idle at a logic HIGH.

Waveforms 92 and 93 represent writing a digital bit from control module 20 to the acquisition modules. Switch 80 is closed for 10 uS it is then opened for 30 uS to write a logic '1' (waveform 92), or kept closed for 30 uS to write a logic '0' (waveform 93). Switch 80 is then set open for an additional 30 uS minimum. The acquisition modules detect the signal line's LOW state, and sample the signal line 30 uS later. The state of the bus at that sample time determines the bit received. If the signal line is HIGH the bit is '1', if LOW the bit is '0'. The process is repeated for each additional bit of information.

Waveforms 94 and 95 represent reading a bit by control module 20 from the acquisition modules. In operation control module 20 will write data to the acquisition modules that requires a response. In this way control module 20 knows when to expect to receive data from the acquisition modules. This timing is important since the control module initiates the read operation. As shown by the solid lines in waveforms 94 and 95, control module 20 closes switch 80 for 10 uS, it then opens switch 80. The acquisition module(s) detect the signal line's LOW state and respond by closing the module's switch for a logic '0' (waveform 95) or leaving the module's switch open for a logic '1' (waveform 94). The acquisition module maintains this switch state for 40 uS, then opens the switch. Control module 20 samples the state of the signal line 30 uS after it initiated the process to determine the bit value.

Note that during the read process, if more than one acquisition module responds, any one module presenting a logic '0' will result in control module 20 reading a logic '0', regardless if any other acquisition module is presenting a logic '1'. Also note that if no acquisition modules are present on the bus, control module 20 will always read a logic '1'. These facts are useful in identifying and differentiating between the acquisition modules on the bus.

The three-wire bus system has several advantages over multi-wire designs. Power and data communication are provided with a minimum of conductors; this results in a simpler, lighter, and less expensive system. Also, the number of acquisition modules is not limited by address lines or address settings. Additional acquisition modules can be added to the system by simply plugging them in to the last module on the bus.

Module Identification

While in the data logging mode of operation information (in the form of commands and addresses) travels in one direction only—from control module 20 to the acquisition modules. All of the acquisition modules monitor the bus and perform simultaneous operations. Operation of control module 20 is the same regardless of what (or how many) acquisition modules are present.

However, in the communication mode the host computer, via control module 20, must be able to individually access each acquisition module (to read data, save parameter memory, and test each module). To accomplish this access, each module must be identified. Each acquisition module has a unique, 3 byte (24 bit) I.D. word. This I.D. word identifies the type of module as well as a serial number for the module. The I.D. is programmed into the microprocessor (or other module memory) during the manufacturing process or during a post-manufacturing test.

Figure 9:
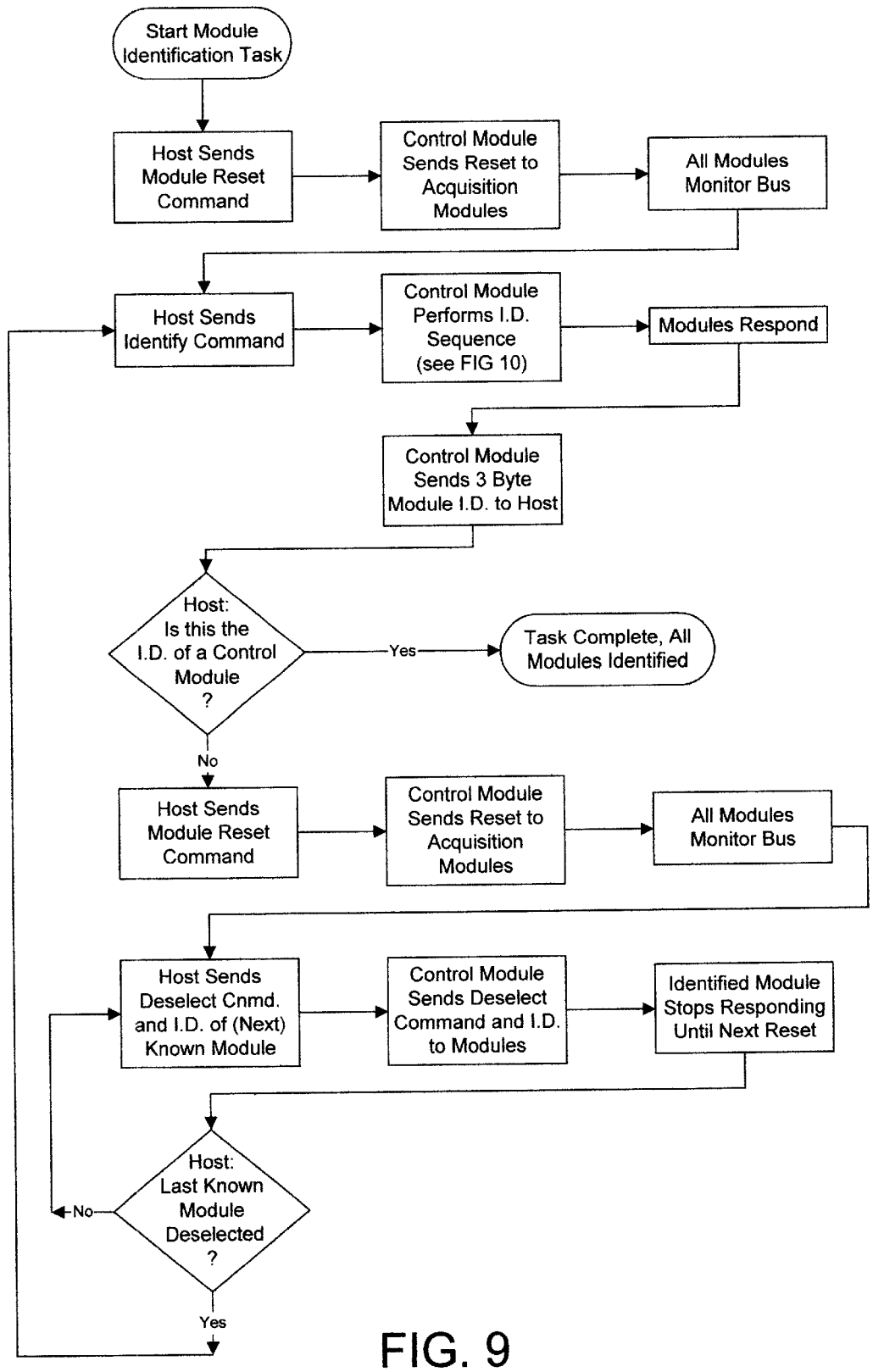
FIG. 9 is a flow chart of the module identification process.

FIG. 9 is a flow chart that shows the module identification process. With power applied and the system in communication mode, the host computer sends a "reset" command to control module 20. Control module 20 in turn creates a reset condition on the three-wire bus. This resets all the acquisition modules so that they monitor the bus for commands.

The host then sends an "identify modules" command. Control module 20 then performs an I.D. sequence (described below) and returns the I.D. of one of the modules currently monitoring the bus to the host computer. If there are no modules currently monitoring the bus, control module 20 will send its own I.D. to the host.

The host computer saves this I.D., forming a list of identified modules. If the module type portion of the I.D. is that of a control module, the process is complete since no more modules are monitoring the bus.

If the I.D. is not that of a control module the process continues. The host again sends a "reset" command, so all modules monitor the bus. The host then sends a "deselect module" command followed by the I.D. of a previously identified module from the host computer's list. Control module 20 relays this command and I.D. to the modules. The acquisition module with a matching I.D. stops monitoring the bus (except for reset signals). This effectively takes this module off the bus. The host repeats the process of sending the "deselect module" command for each identified module in its list.

The host then issues another "identify modules" command, receives the I.D. of a previously unidentified module, and adds it to the list. The host then issues a "reset" command followed by "deselect module" commands for each identified module (including the one just identified).

This process is repeated with each pass yielding the I.D. of another module, until the last (control module I.D.) is found. When complete, the host computer has a list of all the modules in the system. Accessing a particular module then requires the host to issue a "reset" command (to get the attention of all modules) followed by a "select module" command and the I.D. for that module. The "select module" command causes all modules not matching that I.D. to stop responding to bus commands, until the next reset. This isolates a single module for module specific commands as detailed in the "Host Computer Communication Mode" section of this disclosure.

Figure 10:
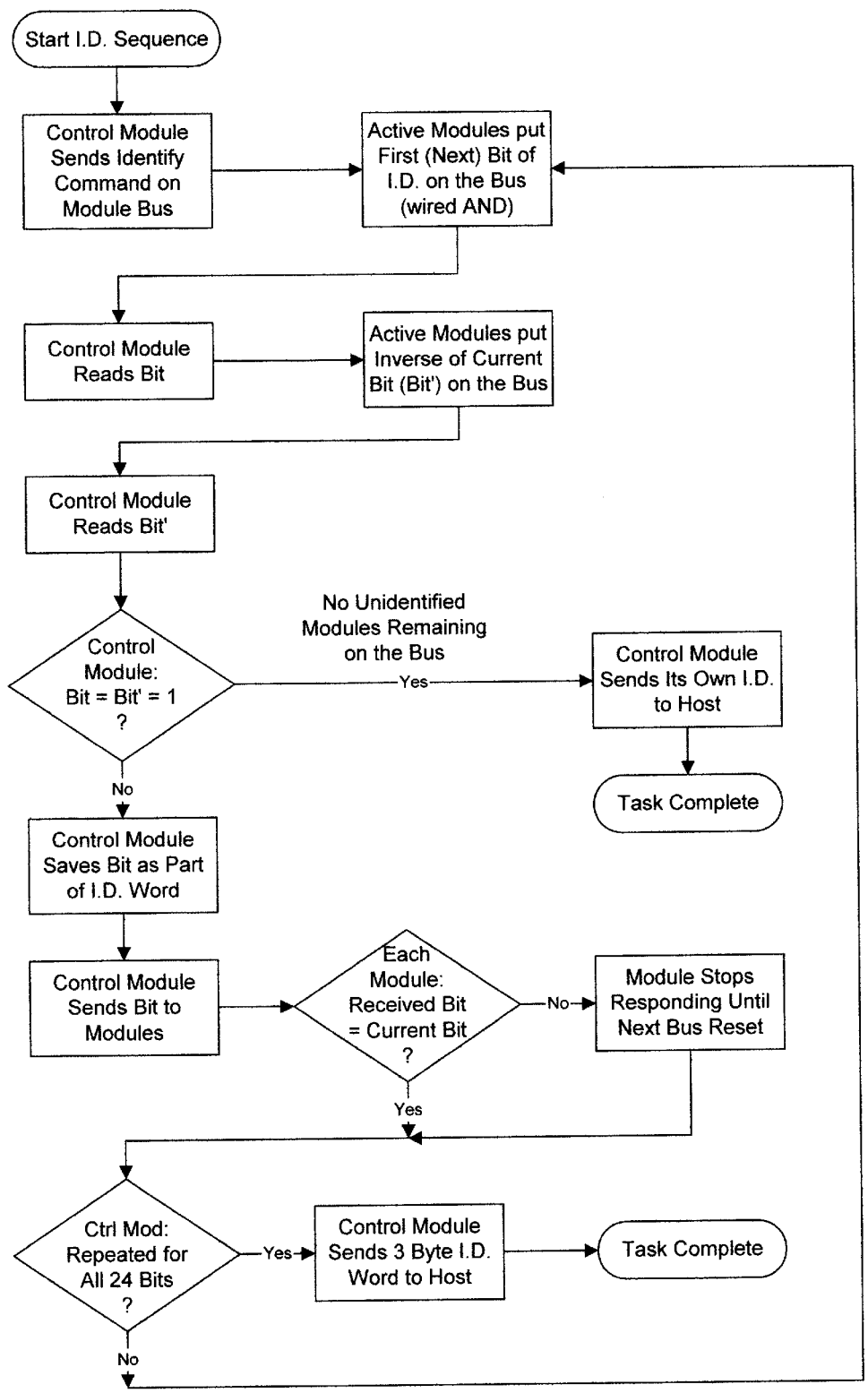
FIG. 10 is a flow chart detailing control module processes during module identification.

The control module I.D. sequence referenced above is detailed in FIG. 10. When the host computer issues an "identify modules" command, control module 20 relays the command to the acquisition modules. The acquisition modules currently monitoring the bus (those not deselected) each place the first bit of their I.D. word onto the bus. Control module 20 reads the bit. Note that if more than one module is active and both '1' and '0' values are put on the bus, control module 20 will read this as a '0'.

The acquisition modules currently monitoring the bus will then place the complement ('1' if previously '0' or '0' if previously '1') of the same I.D. bit on the bus. Control module 20 reads this bit. If both bits are read by control module 20 as equal to '1' this indicates that no modules are monitoring the bus. In this case control module 20 sends the host its own I.D. and the task is complete.

If control module 20 reads any other combination of bits ('0 0', '0 1', or '1 0') it saves the first bit as the first bit of the module I.D. Control module 20 then writes this bit to the module bus. Each acquisition module currently monitoring the bus compares this bit to the first bit of its I.D. word. If it does not match the module stops responding to bus commands until the next reset. This leaves only acquisition modules with matching I.D. bit patterns on the bus.

The process continues with the modules putting the second bit of their I.D. on the bus, followed by the complement of that bit, and so on. All 24 bits of the three byte I.D. word are processed. Since each module has a unique I.D., there will be only one module on the bus for the full 24 bit sequence. Control module 20 will have created the full I.D., by assembling one bit during each pass. The resulting I.D. is then sent to the host computer, completing the task.

Parameter Memory and Calibration

The parameter data area within each module's memory is used to hold calibration values specific to an individual module. The parameter data memory is treated separately from the acquisition memory, although it may be located within the same physical memory device. The calibration values can be used by the module during acquisition (e.g. programmable gain amplifier settings or acquisition period), other values can be used by the host computer for post acquisition processing (e.g. digital-to-physical unit conversion factors or offset values).

These parameter values are programmed into the memory after the module is manufactured as part of a test and calibration process. Storing these values can often eliminate the need for adjustment and trimming of the module during the manufacturing process.

Taking the altitude module as an example: commonly available pressure sensors typically have large part-to-part variations in sensitivity, offset, and linearity. It is standard practice to compensate for these variations by incorporating potentiometers or other adjustable components in the design. Each of these components require adjustment on a unit-by-unit basis. Using the stored parameter data of this invention, the cost and added circuit complexity of these adjustable parts are eliminated. After manufacture, each module is tested (using a reference pressure source and computer system) to determine compensating coefficients unique to the module under test. These coefficients are then programmed into the module's parameter memory. The module itself, having limited computational power, may not use all (or any) of these stored parameters. The module may simply record the raw, A/D converted data from the sensor. After acquisition is complete, the host computer can read the module's parameter memory as well as the raw acquired data. The host, having much more processing power, can then manipulate the raw data, using the retrieved compensating coefficients, to produce desired, corrected data.

From the foregoing, it will be appreciated that the present invention represents a significant advance in data logging equipment. While the above description contains many specific details, these should not be construed as limitations on the scope of the invention, but only as examples used in the preferred embodiment. Many other variations are possible without departing from the spirit of the invention. For example, battery-backed random access memory (RAM), or Flash memory could be used in place of EEPROM. Alternatives to the three-wire module bus could be implemented, including multi-wire schemes with separate input and output data lines, separate address and data lines, or parallel data lines. Of course, additional physical properties could be measured such as: temperature, humidity, frequency, light intensity, sound intensity, flow rate, stress, strain, angular position, and global position. Accordingly, the scope of the invention should not be determined by the illustrated embodiment, but by the following claims and their legal equivalents.

I claim:

1. A modular data sensing and logging system comprising:
    a control module having means for generating a periodic timing signal at predetermined intervals, and a module bus interface, said generating means being suitably connected to said module bus interface;
    one or more acquisition modules each having means for measuring and converting a predetermined physical property into a digital value, a memory having a multiplicity of addressable storage locations, and means for managing storage of said digital values into specific storage locations within said memory, said managing means being suitably connected to said memory and to said measuring and converting means, said managing means further having a module bus connection;
    a module bus interconnecting said module bus interface of said control module and each module bus connection of said acquisition modules;
    whereby, said generating means of said control module periodically signals each said acquisition module via said module bus causing said measured and converted digital value to be stored into said acquisition module memory.

2. The system of claim 1 wherein said control module includes an address counter suitably connected to said generating means and to said module bus interface, whereby address information is periodically sent to each said acquisition module via said module bus resulting in said digital value being stored in said acquisition module memory at a specifically addressed location.

3. The system of claim 1 wherein said control module includes a host computer interface for communicating with a computer external to the system, said host computer interface being suitably connected to said module bus interface so as to allow information to be transferred to and from said module bus.

4. The system of claim 3 wherein said generating means of said control module includes a programmable time interval register for establishing the interval of said periodic timing signal, said time interval register being suitably connected to said host computer interface, whereby the interval of said periodic timing signal can be programmed via said host computer interface.

5. The system of claim 1 wherein said managing means of said acquisition modules include means for retrieving and modifying said digital values from said memory, and means for presenting said digital values from said memory onto said module bus, in response to commands presented via said module bus.

6. The system of claim 5 wherein said acquisition modules each have unique identification data and means for presenting said identification data onto said module bus, said acquisition modules each having means for selectively responding to said commands dependent on said identification data.

7. The system of claim 1 wherein said managing means is a single-chip microprocessor.

8. The system of claim 1 wherein said acquisition module memory is subdivided into an acquisition memory area for storing said measured and converted digital values, and a parameter area for storage of calibration factors.

9. The system of claim 1 wherein said module bus comprises a power line, a ground line, and a signal line.

10. The system of claim 1 wherein one or more said acquisition modules are collocated in a single assembly with said control module.

11. The system of claim 1 wherein two or more acquisition modules are combined into a single acquisition module.

12. The system of claim 1 wherein said acquisition module memory comprises a device selected form the group consisting of battery-backed RAM, EEPROM, and Flash memory.

13. The system of claim 1 wherein said physical property is selected from the group consisting of altitude, airspeed, rotational speed, magnetic force, gravitational force, stress, strain, pressure, temperature, humidity, pulse width, frequency, voltage, electrical current, light intensity, sound intensity, rate of flow, angular position, and global position.

14. The system of claim 1 wherein said measuring and converting means comprises a converter circuit selected from the group consisting of analog-to-digital converter, frequency-to-voltage converter, pulse width timer, and frequency counter.

15. A method for sensing and logging data comprising the steps of:

generating a periodic timing signal within a control module;

conveying said periodic timing signal to a module bus;

receiving of said periodic timing signal by one or more acquisition modules from said module bus;

measuring a predetermined physical property and converting said property to a digital value by each acquisition module; and storing said digital value memory within each acquisition module.

16. The method of claim 15 wherein the step of generating a periodic timing signal comprises the steps of:

incrementing an address counter value at a predetermined interval, and presenting said address counter value as a periodic timing signal.

17. The method of claim 16 wherein the step of storing said digital value comprises the steps of:

extracting said address counter value from said periodic timing signal; and storing said digital value into a specific address location, as indicated by said address counter value, within said acquisition module memory.

18. The method of claim 15 further comprising the steps of:

receiving a command from a host computer by said control module;

conveying said command from said control module to said acquisition modules via said module bus;

responding to said command;

conveying the response from said acquisition modules to said control module via said module bus; and sending the response to said host computer from said control module.

19. The method of claim 18 wherein the step of responding to said command comprises the steps of:

retrieving said digital value from said memory, and presenting said digital value in response to said command.

20. The method of claim 18 further comprising the steps of:

presenting a query for identification values, from said host computer, via said control module and said module bus, to said acquisition modules;

receiving, in turn, a unique identification value from each of said acquisition modules;

transmitting one specific identification value to said acquisition modules;

sending additional commands to said acquisition modules; and receiving responses only from the single acquisition module having said specific identification value.

* * * * *